United States Patent [19]

Hartz

[11] 4,011,021

[45] Mar. 8, 1977

[54] COMPENSATORY JOINT

[76] Inventor: Helmut Hartz, Hedwigstrasse 24, Wanne-Eickel, Germany, 4680

[22] Filed: Sept. 12, 1975

[21] Appl. No.: 612,809

[30] Foreign Application Priority Data

Sept. 13, 1974 Germany ............................ 2443804

[52] U.S. Cl. .................................. 403/220; 64/1 V; 64/13; 64/27 NM; 403/41

[51] Int. Cl.² .......................................... F16G 11/00

[58] Field of Search ............ 403/31, 220, 225, 227, 403/41; 64/1 V, 11 R, 11 P, 27 R, 27 NM, 27 F, 13, 30 R

[56] References Cited

UNITED STATES PATENTS

| 2,873,010 | 2/1959 | Alma | 64/13 X |
|---|---|---|---|
| 3,080,732 | 3/1963 | Crankshaw | 64/11 R X |
| 3,418,827 | 12/1968 | Bernard | 64/11 R |
| 3,557,573 | 1/1971 | Hänsgen | 64/13 |

FOREIGN PATENTS OR APPLICATIONS 905,562   3/1954   Germany ........................... 64/11 R

*Primary Examiner*—Wayne L. Shedd
*Attorney, Agent, or Firm*—Karl F. Ross; Herbert Dubno

[57] ABSTRACT

A joint interconnecting a driving member and a driven member with limited relative mobility comprises one or more elastic rings each bracketed by an outer and an inner annular plate, the plates being respectively secured to the two members. A friction coupling is inserted between one of the outer plates and one of the inner plates to damp relative oscillations between the two members without excessive heating of the elastic rings. The friction coupling may be formed by a brake lining inserted between the two plates, or a pair of such brake linings separated by a resilient annular spacer.

9 Claims, 3 Drawing Figures

COMPENSATORY JOINT

FIELD OF THE INVENTION

My present invention relates to a compensatory joint designed to interconnect a driving member and a driven member with limited relative mobility, especially in the radial and in the peripheral direction, for the transmission of torques therebetween.

BACKGROUND OF THE INVENTION

Elastic joints are known which facilitate radial, axial and/or angular shifts between two such members, allowing them to be operated even with their axes mutually offset or disaligned. Such joints also permit some torsional compensation, i.e. a relative rotation of the two members to cushion the shocks of rapid acceleration or deceleration during starting and stopping, for example.

Joints of this type may comprise elastic connecting elements of leather, rubber, plastic, spring steel or the like. If the elastic material has a low damping coefficient, the system may break into oscillations whenever there is a substantial change in the transmitted torque. If the damping factor is high, the oscillatory energy will be largely converted into heat which is absorbed by the connecting elements themselves and is detrimental to their structural stability.

OBJECTS OF THE INVENTION

The general object of my present invention, therefore, is to provide an improved joint for the transmission of torque between two approximately coaxial members with freedom of limited relative radial and/or peripheral displacement thereof, this joint including means for suppressing undesirable oscillations without overheating its elastic element or elements.

Another object is to provide an improved joint of this character wherein the relative axial position of the two members is substantially fixed.

SUMMARY OF THE INVENTION

I realize these objects, in accordance with my present invention, by the provision of first mounting means securable to one of the two members to be interconnected, second mounting means securable to the other member, the two mounting means being positively connected with one or more interposed elastic rings, and a friction coupling inserted between these mounting means for the purpose of damping any relative oscillations of the two members.

More particularly, the first mounting means according to my invention comprises axially spaced first and second annular plates bracketing a third annular plate which forms part of the second mounting means, one elastic ring being disposed between and secured to the first and third annular plates while the friction coupling is disposed between the second and third plates. If desired, the second mounting means may include a fourth annular plate axially spaced from the first mounting means, with interposition of another elastic ring between this fourth plate and the second plate of the first mounting means which coacts with the friction coupling.

The connecting ring or rings of such a joint may have a low inhering damping factor since they are not required to attenuate any nascent oscillations. Thus, they may consist of a highly elastic material such as, for example, natural rubber.

Since the coefficient of friction between two contacting surfaces varies inversely with their relative motion, a maximum damping effect will be exerted by the friction coupling when there is a small slip between the driving and the driven members, i.e. when oscillations of large amplitude and low frequency tend to occur therebetween. Conversely, with high-frequency torsional oscillations of small amplitude a proportionally smaller amount of mechanical energy is converted into heat. The heat, in either case, is absorbed by the friction coupling itself which is shielded from the adjoining elastic ring or rings by the interposed annular plate or plates. The friction coupling may comprise a brake lining of the usual type, either as a layer on one of the coacting annular plates or as part of a separate insert such as a disk of sintered iron particles. In a more elaborate assembly, designed to afford greater angular mobility between the two members, the friction coupling may comprise a pair of axially spaced brake shoes and an annular pressure-transmitting spacer interposed therebetween.

BRIEF DESCRIPTION OF THE DRAWING

The above and other features of my invention will now be described in detail with reference to the accompanying drawing in which.

SPECIFIC DESCRIPTION

Figure 1:
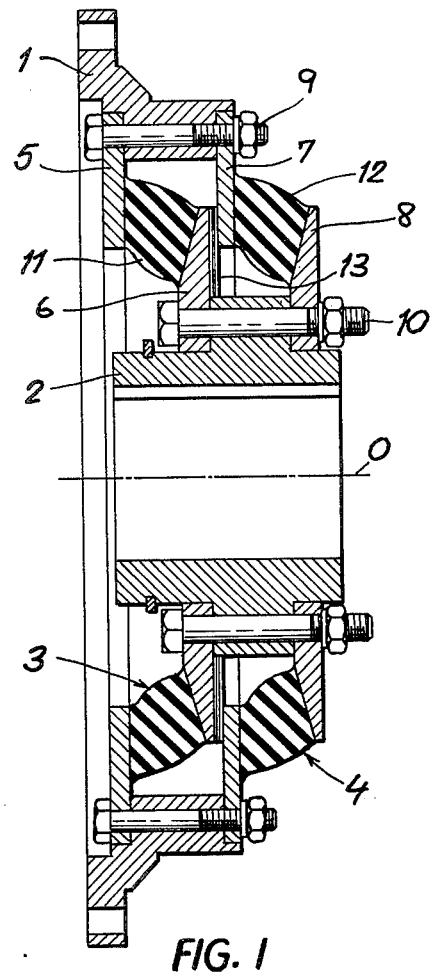
FIG. 1 is an axial sectional view of a compensatory joint according to my invention.

In FIG. 1 I have shown a joint designed to transmit torque between two members 1 and 2, one of them being coupled to a power source to act as a driving member while the other is coupled to a load to act as a driven member. As here shown, member 1 is in the shape of a flange surrounding the hub-shaped member 2, the two members being normally centered on a common axis 0. Flange 1 may be bolted to a similar flange on a motor shaft whereas hub 2 may be keyed to a load shaft; conversely, the nonillustrated shaft keyed to hub 2 may be that of a motor while flange 1 is bolted to a load such as a flywheel.

Member 1 is provided with mounting means in the form of a pair of annular plates or disks 5, 7 which lie in axially spaced transverse planes and are secured to the flange in a fixed relative axial position by a set of bolts 9. Similar annular plates or disks 6, 8 are mounted on hub 2 and are held in an axially fixed relative position by bolts 10. The outer plates 5, 7, with inner and outer radii larger than the corresponding radii of inner plates 6, 8, are interleaved with these latter plates so that plate 6 is bracketed by plates 5 and 7.

An elastic ring 11 of rubber, for example, is interposed between plates 5 and 6 and is adhesively bonded thereto so as to act as a yieldable torque transmitter. A similar ring 12 is inserted in like manner between plates 7 and 8. Assemblies 5, 6, 11 and 7, 8, 12 thus constitute a pair of cascaded elastic coupling stages 3 and 4 allowing a measure of relative radial and peripheral displacement therebetween as well as some angular disalignment in an axial plane.

In accordance with the present invention, a brake lining 13 is inserted between plates 6 and 7 to attenuate relative torsional oscillations between members 1 and 2. Lining 13 may be a coating on plate 6 or may be a self-supporting annular disk of sintered iron or the like keyed to or freely supported on hub 2. Elements 5 - 13, or some of them, may be peripherally subdivided into a plurality of segments for easier assembly.

The relative axial spacing of the paired plates 5, 7 and 6, 8 is so chosen that the rings 11 and 12 are held under a certain amount of precompression therebetween so as to tend to maintain the two members 1, 2 in a predetermined relative axial position.

The mode of operation of the joint shown in FIG. 1 would be unchanged if one or the other ring 11, 12 were omitted. If larger torques are to be transmitted, a further coupling stage or stages may be added.

Figure 2:
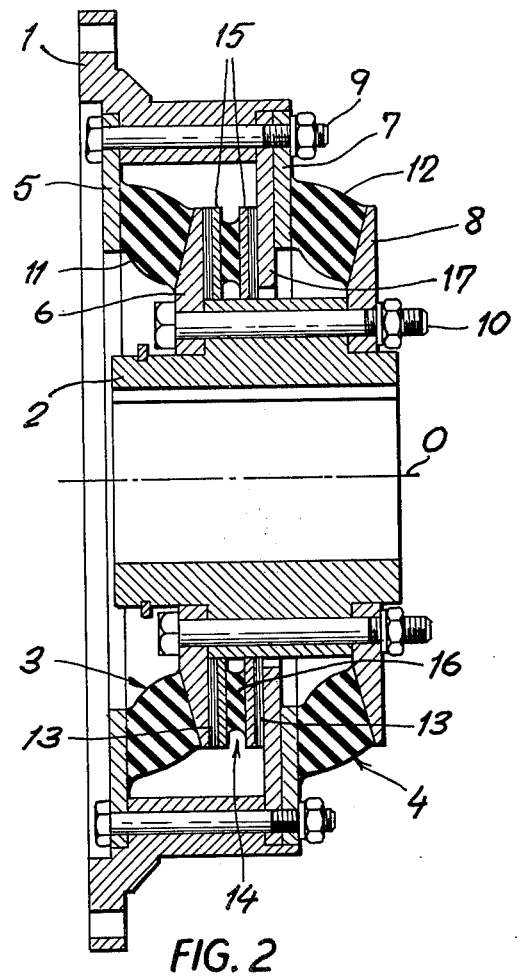
FIG. 2 is a view similar to FIG. 1, illustrating an alternate embodiment.

FIG. 2 shows a similar joint wherein, however, the plates 5 and 7 are more widely spaced apart and the simple friction coupling 13 has been replaced by a composite coupling 14 consisting of two brake shoes 15 bracketing a resilient annular pad 16. Furthermore, an annular spacing disk 17 is inserted between friction coupling 14 and mounting plate 7, being held in position on member 1 by the bolts 9. With the use of spacing plates 17 of different thickness, the degree of precompression of elements 11, 12, 16 may be varied. The shoes 15 and the ring 16 of friction coupling 14 can also be segmented, if desired, the same as spacing disk 17.

Figure 3:
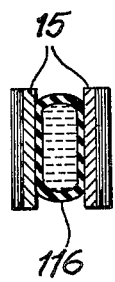
FIG. 3 is a detail view showing a partial modification of the joint of FIG. 2.

Any oscillations that might still occur between members 1 and 2 will be transmitted to ring 16 only in highly attenuated form so that the elasticity of this ring in the peripheral direction has little influence upon the operation of the joint. In fact, this ring may be replaced by an inflated annular tube or bladder 116, filled with a preferably liquid pressure-transmitting fluid such as water, as illustrated in FIG. 3; such an element readily accommodates itself to changes in the distribution of axial stresses from rings 11 and 12 upon a relative tilting of members 1 and 2.

I claim:

1. A joint for interconnecting a driving member and a driven member with limited relative peripheral and radial mobility, comprising:
   rigidly interconnected, axially spaced first and second coaxial annular plates securable to one of said members;
   a third annular plate bracketed by said first and second annular plates and securable to the other of said members;
   a friction coupling separating said second and third annular plates from each other; and
   an elastic ring interposed between said first and third annular plates and positively connected therewith for transmitting torques therebetween and for axially pressing said friction coupling into contact with said second annular plate.

2. A joint as defined in claim 1 wherein the axial spacing of all said annular plates is such as to keep said ring under axial compression.

3. A joint as defined in claim 1 wherein said friction coupling comprises a brake lining.

4. A joint as defined in claim 1 wherein said friction coupling comprises a pair of axially spaced brake shoes and an annular pressure-transmitting element interposed therebetween.

5. A joint as defined in claim 4 wherein said pressure-transmitting element comprises a fluid-filled chamber.

6. A joint as defined in claim 4 wherein said friction coupling further comprises an annular spacing disk inserted between one of said brake shoes and said second annular plate.

7. A joint as defined in claim 1 wherein said first and second annular plates have inner and outer radii larger than corresponding radii of said third annular plate.

8. In combination, a driving member, a driven member and a joint as defined in claim 1, one of said members being secured to said first and second annular plates, the other of said members being secured to said third annular plate.

9. A joint as defined in claim 1, further comprising a fourth annular plate coaxial and rigid with said third annular plate and axially spaced from said first and second annular plates, and another elastic ring disposed between and secured to said second and fourth annular plates.

* * * * *